(12) United States Patent
Dunn et al.

(10) Patent No.: US 9,038,803 B2
(45) Date of Patent: May 26, 2015

(54) INFLATABLE LINER SYSTEMS

(71) Applicant: Corrosion Engineering, Inc., Mesa, AZ (US)

(72) Inventors: Donald C. Dunn, Mesa, AZ (US); Jerry F. Hofberger, Mesa, AZ (US)

(73) Assignee: Corrosion Engineering, Inc., Mesa, AZ (US)

( * ) Notice: Subject to any disclaimer, the term of this patent is extended or adjusted under 35 U.S.C. 154(b) by 0 days.

(21) Appl. No.: 14/144,241

(22) Filed: Dec. 30, 2013

(65) Prior Publication Data

US 2014/0110218 A1    Apr. 24, 2014

Related U.S. Application Data

(63) Continuation-in-part of application No. 13/010,418, filed on Jan. 20, 2011, now Pat. No. 8,616,358.

(60) Provisional application No. 61/297,634, filed on Jan. 22, 2010, provisional application No. 61/320,384, filed on Apr. 2, 2010.

(51) Int. Cl.
*B65D 88/66* (2006.01)
*B65G 11/16* (2006.01)

(52) U.S. Cl.
CPC .............. *B65D 88/66* (2013.01); *B65G 11/166* (2013.01); *B65G 2207/48* (2013.01)

(58) Field of Classification Search
USPC ........ 198/550.2, 533; 193/2 R, 4, 25 R, 25 E, 193/25 C, 25 B; 222/161, 198, 196, 197, 222/199, 200, 202, 203, 216, 220, 225, 209, 222/244, 195
See application file for complete search history.

(56) References Cited

U.S. PATENT DOCUMENTS

| | | |
|---|---|---|
| 3,346,917 A | 10/1967 | Lennox |
| 4,251,013 A | 2/1981 | Krause |
| 4,945,957 A | 8/1990 | Kardux et al. |
| 5,921,369 A | 7/1999 | Steele |
| 6,250,450 B1 | 6/2001 | Howard |
| 6,684,999 B1 | 2/2004 | Howard |
| 6,823,904 B2 | 11/2004 | Finke et al. |
| 7,232,023 B2 | 6/2007 | Ellis et al. |
| 7,588,134 B2 | 9/2009 | McKeough |
| 2009/0020391 A1 | 1/2009 | McKeough |

FOREIGN PATENT DOCUMENTS

| | | |
|---|---|---|
| JP | 11-043215 A | 2/1999 |
| JP | 11-189328 A | 7/1999 |

*Primary Examiner* — Leslie A Nicholson, III
(74) *Attorney, Agent, or Firm* — Lodestar Patents, PLLC; Raymond J.E. Hall

(57) ABSTRACT

An inflatable liner with vibratory function related to lining mining hoppers and other such devices. The inflatable liner has an exterior expandable layer and ceramic wear layer beneath that assists maintaining a long-use-life of the inflatable liner. Use of the air-control device to rapidly inflate and deflate exterior expandable layer vibrates in the exterior expandable layer and assist removing unwanted material/debris from the exterior lining of exterior expandable layer to further maintain a long-life use of the inflatable liner and lower maintenance of the machinery/hopper.

24 Claims, 8 Drawing Sheets

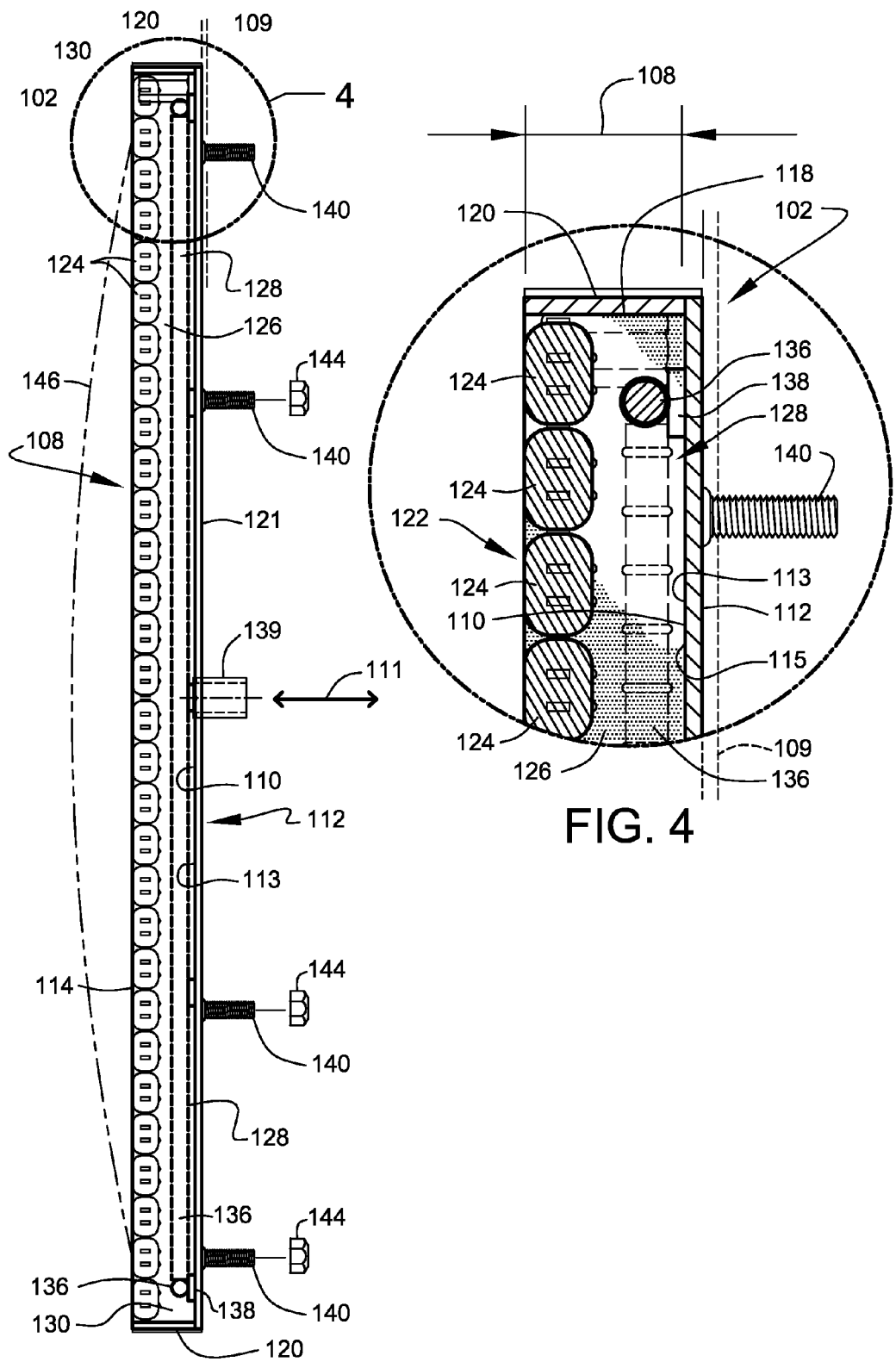

INFLATABLE LINER SYSTEMS

CROSS-REFERENCE TO RELATED APPLICATION

The present application is a continuation-in-part of, and is related to and claims priority from, application Ser. No. 13/010,418, filed Jan. 20, 2011, entitled "INFLATABLE LINER SYSTEMS", which prior application is related to and claims priority from prior provisional application Ser. No. 61/297,634, filed Jan. 22, 2010, entitled "INFLATABLE LINER SYSTEMS", and prior provisional application Ser. No. 61/320,384, filed Apr. 2, 2010, entitled "INFLATABLE LINER SYSTEMS", the contents of all of which are incorporated herein by this reference and are not admitted to be prior art with respect to the present invention by the mention in this cross-reference section.

BACKGROUND

This invention relates to providing a system for improved wear liners used on machinery such as truck beds, hoppers, and heavy material haulers. More particularly, this invention relates to providing a wear liner system that both protects such material handling equipment from abrasive wear and enhances the flow performance of the equipment by dislodging accumulations of bulk material, which tends to collect over the surfaces of the wear liners during material handling operations.

Bulk material handling equipment is widely used in industry to transport materials, such as ores, while the ores are in a loose bulk form. Many of the transported materials have a tendency to build up on the surface of the wear liners during material handling operations. If the material being handled has sufficient cohesive strength, the stagnant material buildup can reduce the overall flow efficiency of the material handling operation and can often fully interrupt the material flow. A need therefore exists for practical, cost-effective, and reliable solutions addressing these common and often costly problems.

OBJECTS AND FEATURES OF THE INVENTION

A primary object and feature of the present invention is to provide a system overcoming the above-mentioned problems.

It is a further object and feature of the present invention to provide such a system that improves the wear, durability and performance of wear liners, with particular focus on inflatable wear liners.

It is another object and feature of the present invention to provide such a system of wear liners inflated using vibratory pulsing of a pressurized fluid to incrementally deform the outer surface of the liners.

A further primary object and feature of the present invention is to provide such a system that is efficient, inexpensive, and useful. Other objects and features of this invention will become apparent with reference to the following descriptions.

SUMMARY OF THE INVENTION

In accordance with a preferred embodiment hereof, this invention provides a system relating to preventing material from accumulating on at least one interior wall surface of at least one material delivery passage during material handling operations, such system comprising: at least one wear liner structured and arranged line the at least one interior wall surface of the at least one material delivery passage, such at least one wear liner comprising at least one material-exposed wear layer structured and arranged to reduce abrasive wear to the at least one interior wall surface during such material handling operations, and at least one inflatable cavity structured and arranged to allow pressurized air to be introduced between such at least one material-exposed wear layer and the at least one interior wall surface; at least one incremental inflator structured and arranged to incrementally inflate such at least one inflatable cavity using pressurized air supplied to such at least one inflatable cavity in a series of pressure pulses, each pressure pulse of the series separated by a partial deflation of such at least one inflatable cavity; at least one mount structured and arranged to mount such at least one wear liner over the at least one interior wall surface; wherein such at least one material-exposed wear layer comprises at least one deformable composition, wherein such incremental inflation of such at least one inflatable cavity produces incremental outward deformation of such at least one material-exposed wear layer; and wherein such incremental outward deformation of such at least one material-exposed wear layer assists in dislodging accumulations of the material within at least one material delivery passage during such material handling operations.

Moreover, it provides such a system wherein such at least one incremental inflator comprises: at least one pressure access port structured and arranged to access the pressurized air supplied from at least one pressurized air source, in fluid communication with such at least one pressure access port and such at least one inflatable cavity, at least one pneumatically-actuated control valve structured and arranged to control the introduction and discharge of the pressurized air into and from such at least one inflatable cavity, and at least one pneumatic valve controller structured and arranged to pneumatically control the opening and closing of such at least one pneumatically-actuated control valve; wherein such at least one pneumatic valve controller comprises at least one valve pulser structured and arranged to cyclically actuate the opening and closing of such at least one pneumatically-actuated control valve to repeatedly inflate and partially deflate such at least one inflatable cavity by supplying the pressurized air in such series of pressure pulses.

Additionally, it provides such a system wherein such at least one pneumatic valve controller further comprises at least one electronic controller structured and arranged to electronically control the duration of the operation of such at least one valve pulser. Also, it provides such a system wherein such at least one electronic controller comprises: at least one computer processor to computer process at least one set of program instructions governing the control outputs of such at least one electronic controller; and at least one user programming interface to enable user programming of such at least one set of program instructions. In addition, it provides such a system wherein: such at least one valve pulser comprises at least one frequency adjuster structured and arranged to adjust the frequency of such series of pressure pulses; and such at least one frequency adjuster is adjustable by the user. And, it provides such a system wherein such at least one material-exposed wear layer comprises: at least one abrasion-resistant core comprising a plurality of abutting wear elements each wear element of such plurality comprising a block of abrasion-resistant material; and at least one resilient encapsulator structured and arranged to substantially encapsulate such at least one abrasion-resistant core.

Further, it provides such a system wherein such at least one inflatable cavity comprises: at least one pressure boundary structured and arranged to provide boundary containment of the pressurized air adjacent such at least one material-exposed wear layer; wherein such at least one pressure boundary comprises at least one peripheral anchor to anchor at least one peripheral portion of such at least one material-exposed wear layer to such at least one pressure boundary; and in fluid communication with such at least one pneumatically-actuated control valve, at least one pressure-boundary air passage structured and arranged to pass the pressurized air through such at least one pressure boundary to such at least one inflatable cavity.

Even further, it provides such a system wherein such abrasion-resistant material of each such wear element comprises substantially high-alumina ceramic. Moreover, it provides such a system wherein such at least one resilient encapsulator comprises substantially resilient rubber. Additionally, it provides such a system wherein: such at least one pressure boundary comprises at least one rigid plate having at least one inner boundary face and at least one continuous peripheral sidewall projecting therefrom; such at least one peripheral anchor comprises at least one linear bar mechanically joined with such at least one inner boundary face and firmly imbedded within such at least one resilient encapsulator. Also, it provides such a system wherein: such at least one rigid plate comprises substantially steel; and such at least one mount comprises at least one threaded stud structured and arranged to receive at least one threaded fastener to assist threaded fastening of such at least one wear liner to the at least one interior wall surface.

In accordance with another preferred embodiment hereof, this invention provides a system relating to preventing material from accumulating on at least one interior wall surface of at least one material delivery passage during material handling operations, such system comprising: at least one wear liner structured and arranged line the at least one interior wall surface of the at least one material delivery passage; and at least one periodic deformer structured and arranged to periodically deform such at least one deformable liner; wherein such at least one deformable liner comprises at least one mount structured and arranged to firmly mount such at least one deformable liner adjacent the at least one interior wall surface at least one wear layer comprising at least one material-exposed surface, such at least one wear layer structured and arranged to reduce abrasive wear to the at least one interior wall surface during such material handling operations, and at least one inflatable cavity structured and arranged to allow at least one positive-pressure fluid to be introduced between such at least one deformable wear panel and the at least one interior wall surface; wherein such at least one periodic deformer comprises at least one fluid access port structured and arranged to access the at least one positive-pressure fluid supplied from at least one positive-pressure fluid source, in fluid communication with such at least one fluid access port and such at least one inflatable cavity at least one control valve structured and arranged to control the introduction and discharge of the at least one positive-pressure fluid into and from such at least one inflatable cavity, and at least one valve controller structured and arranged to control the opening and closing of such at least one control valve; wherein such at least one valve controller comprises at least one valve pulser structured and arranged to cyclically actuate the opening and closing of such at least one control valve; wherein such cyclic actuation of such at least one control valve incrementally inflates such at least one inflatable cavity by supplying the at least one positive-pressure fluid in at least one series of pressure pulses; wherein each pressure pulse of the series is separated by a partial deflation of such at least one inflatable cavity; wherein such at least one wear layer comprises at least one deformable composition; wherein such incremental inflation and partial deflation of such at least one inflatable cavity produces incremental outward deformation of such at least one material-exposed surface; and wherein such incremental outward deformation of such at least one material-exposed surface assists in dislodging accumulations of the material within at least one material delivery passage during such material handling operations. In addition, it provides such a system wherein: the at least one positive-pressure fluid comprises pressurized air; and such at least one periodic deformer is structured and arranged to utilize such pressurized air as the at least one positive-pressure fluid. And, it provides such a system wherein: such at least one control valve comprises at least one pneumatically-actuated valve structured and arranged to be actuated by at least one pulsed pneumatic signal; such at least one valve pulser comprises at least one pneumatic-pulse generator structured and arranged to output such at least one pulsed pneumatic signal using at least one input of the pressurized air; in fluid communication with at least one source of the pressurized air, at least one electrically-actuated valve structured and arranged to supply such at least one input of the pressurized air to such at least one pneumatic-pulse generator, the supplying of such controlled delivery conditional on at least one change of state of at least one electronic control signal received by such at least one electrically-actuated valve, and at least one electronic controller structured and arranged to generate such at least one electronic control signal controlling the actuation of such at least one electrically-actuated valve.

Further, it provides such a system wherein such at least one electronic controller comprises at least one programmable logic controller comprising at least one computer processor to computer process at least one set of program instructions governing the output state of such at least one electronic control signal. Even further, it provides such a system wherein such at least one electronic controller further comprises at least one user programming interface to enable user programming of such at least one set of program instructions. Moreover, it provides such a system wherein such at least one wear layer comprises: at least one abrasion-resistant core comprising a plurality of abutting wear elements each wear element of such plurality comprising a monolithic solid of abrasion-resistant material; at least one resilient encapsulator structured and arranged to substantially encapsulate such at least one abrasion-resistant core; wherein such at least one resilient encapsulator comprises such at least one material-exposed surface, at least one inner encapsulator surface spaced opposite such at least one material-exposed panel surface, and at least one peripheral portion extending peripherally between such at least one material-exposed panel surface and such at least one inner encapsulator surface; the system wherein such at least one inflatable cavity comprises: at least one pressure boundary structured and arranged to provide boundary containment of the pressurized air adjacent such at least one inner surface; wherein such at least one pressure boundary comprises at least one peripheral anchor to anchor such at least one peripheral portion to such at least one pressure boundary; and in fluid communication with such at least one control valve, at least one pressure-boundary air passage structured and arranged to pass the pressurized air through such at least one pressure boundary to such at least one inflatable cavity.

Additionally, it provides such a system wherein such abrasion-resistant material of each such wear element comprises substantially high alumina ceramic. Also, it provides such a system wherein such at least one resilient encapsulator comprises substantially resilient rubber. In addition, it provides such a system wherein: such at least one pressure boundary comprises at least one rigid plate having at least one inner boundary face and at least one continuous peripheral sidewall projecting therefrom; such at least one peripheral anchor comprises at least one linear bar mechanically joined with such at least one inner boundary surface and firmly imbedded within such at least one resilient encapsulator. And, it provides such a system wherein: such at least one rigid plate comprises substantially steel; and such at least one mount comprises at least one projection, permitting secure connection on a user-reachable side of the material handling device, preferably at least one threaded stud structured and arranged to receive at least one threaded fastener to assist threaded fastening of such at least one deformable liner to the at least one interior wall surface.

In accordance with another preferred embodiment hereof, this invention provides a method relating to preventing material from accumulating on at least one interior wall surface of at least one material delivery passage during material handling operations, such method comprising the steps of: providing at least one deformable liner structured and arranged to deformably line the at least one interior wall surface of the at least one material delivery passage, such at least one deformable liner comprising at least one deformable wear panel, comprising at least one material-exposed panel surface, such at least one deformable wear panel structured and arranged to reduce abrasive wear to the at least one interior wall surface during such material handling operations, and at least one inflatable cavity structured and arranged to allow pressurized air to be introduced between such at least one deformable wear panel and the at least one interior wall surface; providing at least one incremental deformer structured and arranged to incrementally deform such at least one deformable liner by repeatedly inflating and partially deflating such at least one inflatable cavity; mounting such at least one deformable liner adjacent the at least one interior wall surface; and periodically deforming such at least one deformable liner by repeatedly inflating and partially deflating such at least one inflatable cavity by delivery of the pressurized air in a series of pressure pulses; wherein such incremental inflation of such at least one inflatable cavity produces incremental outward deformation of such at least one material-exposed panel surface. In accordance with another preferred embodiment hereof, this invention provides a system relating to preventing material from accumulating on at least one interior wall surface of at least one material delivery passage during material handling operations, such system comprising: deformable liner means for deformably lining the at least one interior wall surface of the at least one material delivery passage; and periodic deformer means for periodically deforming such deformable liner means to assist dislodging accumulations of the material within at least one material delivery passage during such material handling operations; wherein such deformable liner means comprises mount means for firmly mounting such deformable liner means adjacent the at least one interior wall surface deformable wear surface means for reducing abrasive wear to the at least one interior wall surface during such material handling operations, and inflatable cavity means for allowing at least one positive-pressure fluid to be introduced between such deformable wear surface means and the at least one interior wall surface; wherein such periodic deformer means comprises fluid access means for accessing the at least one positive-pressure fluid supplied from at least one positive-pressure fluid source, in fluid communication with such fluid access means and such inflatable cavity means control valve means for controlling the introduction and discharge of the at least one positive-pressure fluid into and from such inflatable cavity means, and valve controller means for controlling the opening and closing of such control valve means; wherein such valve controller means comprises valve pulser means for cyclically actuating the opening and closing of such control valve means; wherein such cyclic actuation of such control valve means incrementally inflates such inflatable cavity means by supplying the at least one positive-pressure fluid in a series of pressure pulses; wherein such incremental inflation of such inflatable cavity means produces incremental outward deformation of such deformable wear surface means; and wherein such incremental outward deformation of such deformable wear surface means assists in dislodging accumulations of the material within at least one material delivery passage during such material handling operations.

According to a preferred embodiment of the present invention this invention provides each and every novel feature, element, combination, step and/or method disclosed or suggested by this patent application.

BRIEF DESCRIPTION OF THE DRAWINGS

FIG. 3 shows the sectional view 3-3 of FIG. 2, illustrating preferred internal arrangements of the preferred embodiment of FIG. 1.

FIG. 4 shows a partial sectional view, magnified for clarity, of the inflatable wear liner depicted in FIG. 3, according to the preferred embodiment of the system.

DETAILED DESCRIPTION OF THE BEST MODES AND PREFERRED EMBODIMENTS OF THE INVENTION

Figure 1:
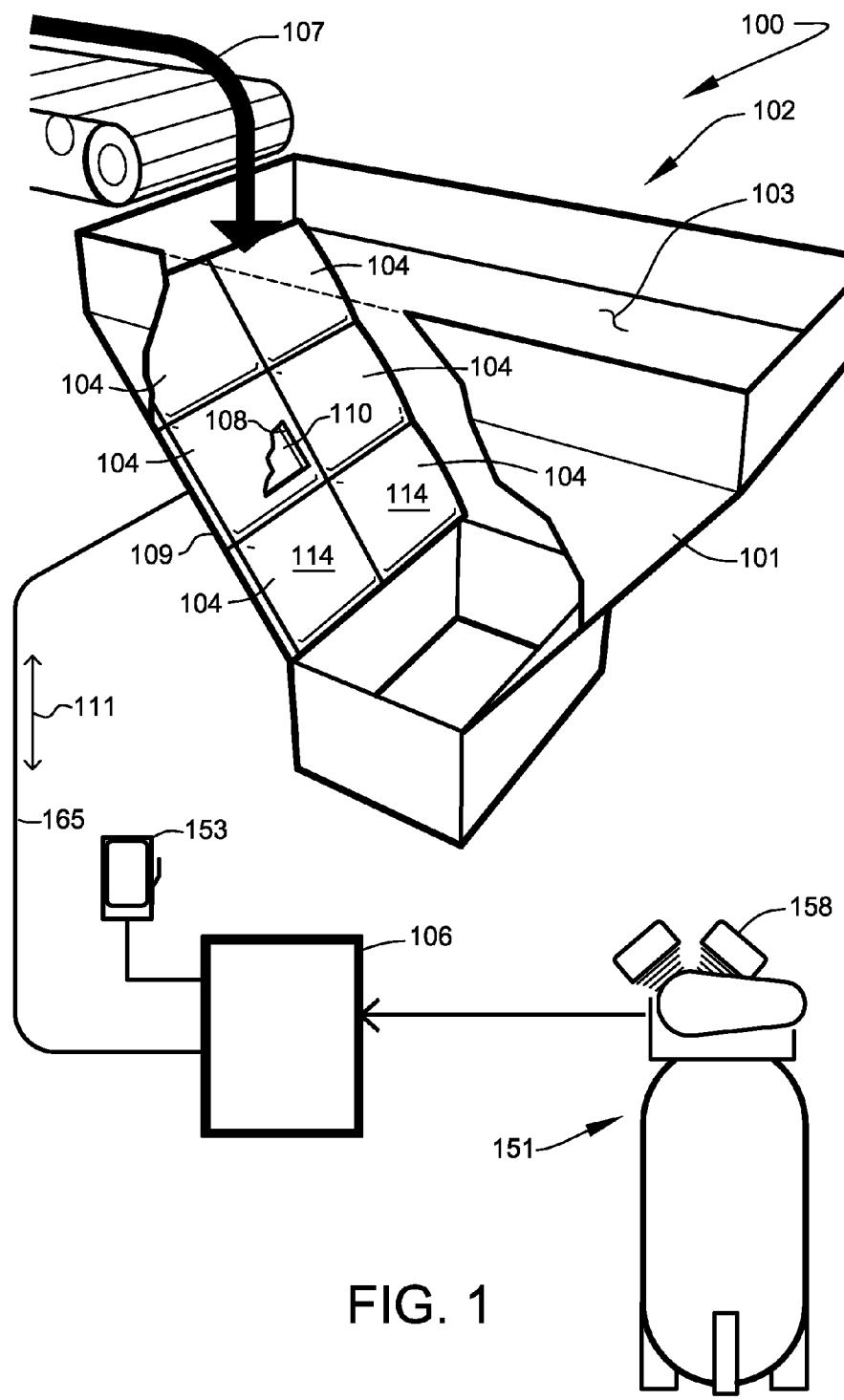
FIG. 1 shows a diagrammatic perspective view, in partial section, of a bulk-material delivery passage adapted to comprise a set of inflatable wear liners and pneumatic inflator apparatus, according to a preferred embodiment of the present invention.

FIG. 1 shows a diagrammatic perspective view of the integration of a preferred embodiment of inflatable wear liner system 100 within a representative material handling apparatus (hereinafter referred to as hopper 101). Hopper 101 is depicted in partial section allowing the internal material delivery passage 103 of the hopper to be viewed without obstruction. A typical configuration of hopper 101 is a wide, bin-like apparatus used to feed bulk materials 107 into another transport or processing apparatus. Generally, hopper 101 is open at the top and tapers at the bottom, as shown.

Those with ordinary skill in the art, upon reading this specification, will appreciate that, under appropriate circumstances, the use of the system in conjunction with other material handling apparatus, such as, for example, chutes, storage bins, conveyers, etc., may suffice.

Preferred embodiments of wear liner system 100, including the depicted inflatable wear liner embodiment 102, preferably comprise one or more mountable inflatable wear liners 104 interoperating with at least one incremental inflator apparatus 106, as shown. In the depicted embodiment of FIG. 1, a set of inflatable wear liners 104 are mounted within the internal material delivery passage 103, approximately below the point of material entry into hopper 101, as shown. Preferably, the set of inflatable wear liners 104 are rigidly mounted to at least one interior wall surface 109 of material delivery passage 103, as shown (at least embodying herein at least one wear liner structured and arranged line the at least one interior wall surface of the at least one material delivery passage). Each inflatable wear liner 104 preferably comprises at least one material-exposed wear layer 108 preferably configured to reduce abrasive wear to interior wall surface 109 during such material handling operations. In addition, each inflatable wear liner 104 preferably comprises at least one inflatable internal cavity 110 (as visible within the partial cutaway) structured and arranged to allow at least one positive-pressure fluid 111 to be introduced between wear layer 108 and the interior wall surface 109. Preferably, installed liners are periodically inflated by incremental inflator apparatus 106. The preferred inflation process inflates inflatable internal cavity 110 using a rapid sequence of positive pressure pulses separated by brief partial deflations of the internal cavity, which preferably results in an outward deformation of the material-exposed wear layers 108 in an incremental "vibratory" manner. This preferred incremental "vibratory" outward deformation effectively dislodges any material buildups on the surface of inflatable wear liners 104 (at least embodying herein at least one deformable liner structured and arranged to deformably line the at least one interior wall surface of the at least one material delivery passage).

Figure 2:
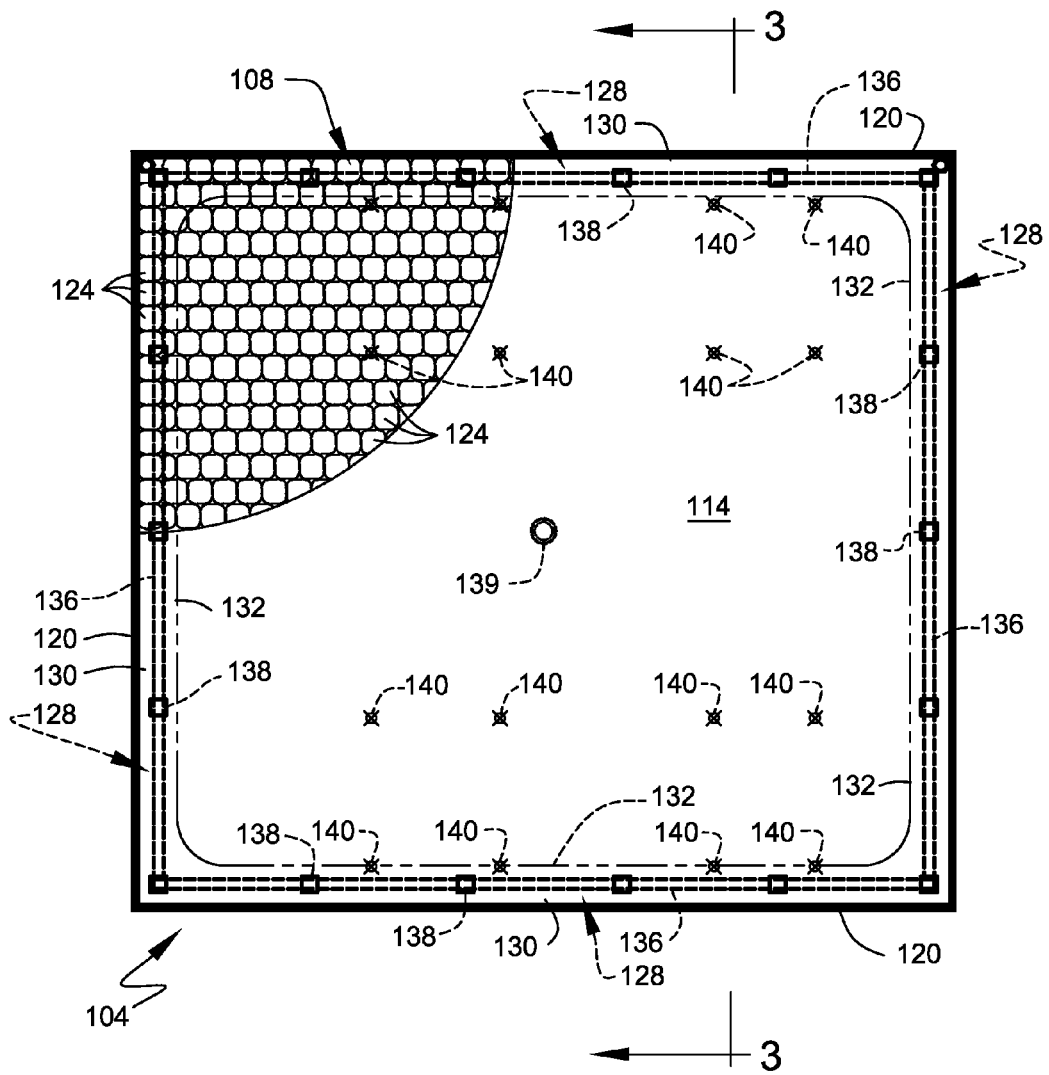
FIG. 2 shows a front view, partially in section, of a single inflatable wear liner according to the preferred embodiment of FIG. 1.

FIG. 2 shows a front view, partially in section, of a single inflatable wear liner 104, according to the preferred embodiment of FIG. 1. FIG. 3 shows the sectional view 3-3 of FIG. 2, illustrating preferred internal arrangements of inflatable wear liner 104. Inflatable wear liner 104 preferably comprises a composite of the deformable wear layer 108 and at least one supportive backing assembly 112, as shown. Wear layer 108 preferably comprises an exposed outer wear surface 114, opposing inner surface 116, and a set of peripheral faces 118 extending between outer wear surface 114 and inner surface 116 as shown.

Backing assembly 112 preferably comprises a rigid backing plate 121 having a planar inner face 115 from which a set of peripheral walls 120 outwardly project, as shown. Wear layer 108 is preferably engaged within backing assembly 112 with inner surface 116 adjoining inner face 115 and the peripheral faces 118 in contact with peripheral walls 120, as shown. Preferably, wear layer 108 and backing plate 121 together form a continuous pressure boundary 113 that preferably defines the preferred inflatable internal cavity 110 of the liner.

Wear layer 108 preferably comprises a flexible composition capable of outward deformation when the underlying inflatable internal cavity 110 is charged with the positive-pressure fluid 111. More specifically, wear layer preferably comprises a deformable abrasion-resistant core 122 embedded within a resilient encapsulation material 126, as shown.

Abrasion-resistant core 122 preferably comprises a plurality of abutting wear elements 124, as shown. In one preferred embodiment of the system, each wear element 124 preferably comprises a rigid abrasion-resistant material, more preferably a monolithic block of hard ceramic. In a preferred embodiment of the system, each wear element 124 comprises outer dimensions of about 1½ inch square by about 1 inch thick. Wear elements 124 are preferably arranged to form a single continuous layer by abutting the sides of the blocks, as shown. The resulting arrangement of blocks is mechanically united by the resilient encapsulation material 126 that substantially surrounds the ceramic blocks, as shown. It is noted that abrasion-resistant core 122 is preferably located at or just below the exposed outer wear surface 114, as shown.

In one preferred embodiment of the system, the resilient encapsulation material 126 comprises an elastomeric composition with at least one molded rubber being most preferred for flexibility and impact attenuating characteristics. Wear layer 108 preferably comprises a minimum thickness of about 1½ inches. It is noted that applicant has successfully tested high-impact wear layers 108 having a thickness of as much as 10 inches.

Both backing plate 121 and peripheral walls 120 are preferably constructed from steel plate. Peripheral walls 120 are preferably permanently joined to backing plate 121 by thermal welding (preferably using continuous fillet welds applied both horizontally and vertically).

FIG. 4 shows a partial sectional view, magnified for clarity, of inflatable wear liner 104 depicted in FIG. 3, according to the preferred embodiment of the system. Preferably, peripheral portion 130 of wear layer 108 is joined to backing assembly 112 using a peripheral anchor assembly 128 and by metal priming. Peripheral anchor assembly 128 is preferably joined with inner face 115 and located adjacent the outwardly-projecting peripheral walls 120, as shown. Peripheral anchor assembly 128 is preferably configured to mechanically anchor a peripheral portion 130 of wear layer 108 to backing plate 121 (at least embodying herein such at least one pressure boundary). Peripheral anchor assembly 128 preferably comprises a set of linear bars 136 mechanically joined with inner face 115 and firmly imbedded within wear layer 108, as shown. In one preferred embodiment of the system, linear bars 136 comprise steel concrete reinforcing bars having the customary pattern of annular ridges, as shown. Linear bars 136 are preferably spaced away from inner face 115 by steel spacers 138 having a thickness of about ¼ inch. Preferably, steel spacers 138 are welded to both linear bars 136 and inner face 115.

The outer peripheral portion 130 is also joined to backing plate 121 and peripheral walls 120 by bonding, preferably assisted by a bonding agent formulated to enhance the adhesion between the two materials. Before molding of the rubber takes place, the metal is prepared by degreasing, sandblasting, or shot blasting in order to completely free the surface from rust and other impurities. The bonding agent is then applied to specific areas of backing assembly 112. In preferred embodiments of the system wear elements 124 are also treated with an adhesion-enhancing primer. The rubber is then placed into the mold for forming and curing.

Priming of backing assembly 112 is preferably limited to regions located beyond an outer border 132 (indicated by the dashed-line depiction of FIG. 2. Depending on the condition of the steel, the metal surfaces may be sand blasted to remove surface contaminants that would otherwise inhibit proper adhesion of the rubber. Preferably, central portion 134 of inner surface 116 (located within outer border 132) is not adhered to the steel. This preferred arrangement preferably establishes a pressure-holding seal at the peripheral interface of the rubber/steel liner assembly, while preferably allowing central separation of the rubber and steel necessary to form the preferred inflatable internal cavity 110 inside the outer border 132.

Backing plate 121 preferably comprises a set of mounts 140 to assist mounting inflatable wear liners 104 onto interior wall surface 109 of hopper 101 or other user-preferred device. In one preferred embodiment of the system, mounts 140 comprise at least one projection permitting secure connection on a user-reachable side of the material handling device. In one preferred embodiment of the system mounts 140 comprise a set of threaded studs thermally welded to rear surface 142 of backing plate 121. Each threaded stud preferably passes through an interior wall surface 109 of material delivery passage 103 and is preferably secured in place by threaded fastener 144 (at least embodying herein such at least one mount comprises at least one threaded stud structured and arranged to receive at least one threaded fastener to assist threaded fastening of such at least one wear liner to the at least one interior wall surface). Upon reading this specification, those with ordinary skill in the art will now appreciate that, under appropriate circumstances, considering such issues as cost, intended use, user preference, etc., other mounting arrangements such as, for example, magnetically held mountings, interference locks, clamps, etc., may suffice.

To enable passage of positive-pressure fluid 111 to inflatable internal cavity 110, pressure boundary 113 is preferably fitted with at least one air passage 139, as shown. Air passage 139 preferably comprises a threaded bung, or similar fitting, preferably mounted to backing plate 121 by thermal welding, as shown (at least embodying herein, at least one air passage to pass positive-pressure fluid through such at least one pressure boundary to such at least one inflatable cavity). Preferably, air passage 139 is operably coupled to incremental inflator apparatus 106, which is preferably configured to inflate and deflate the inflatable internal cavity 110 using positive-pressure fluid 111 delivered in a rapid sequence of pressure pulses, each pulse separated by a fractional exhausting of pressure from the internal cavity. The effect of such pulsed delivery is a vibratory outward deflection of outer wear surface 114 (with each pulse incrementally expanding outer wear surface 114 toward a maximum line of outward deflection 146 shown in FIG. 3 and FIG. 5). Preferably, the liner is inflated to approximately a maximum line of outward deflection 146, as indicated by the dashed-line depiction, before being returned to the initial flattened shape, preferably by relieving the pressure within inflatable internal cavity 110 (preferably equalizing to about the ambient pressure of the operational environment). Applicant found such vibratory movement to be unexpectedly effective in dislodging build-ups of bulk materials 107 adjacent inflatable wear liners 104 (at least embodying herein wherein such outward deformation of such at least one material-exposed wear layer assists in dislodging accumulations of the material within at least one material delivery passage during such material handling operations). Inflation is preferably repeated on at least one user-selected schedule, as described in the following sections.

Figure 5:
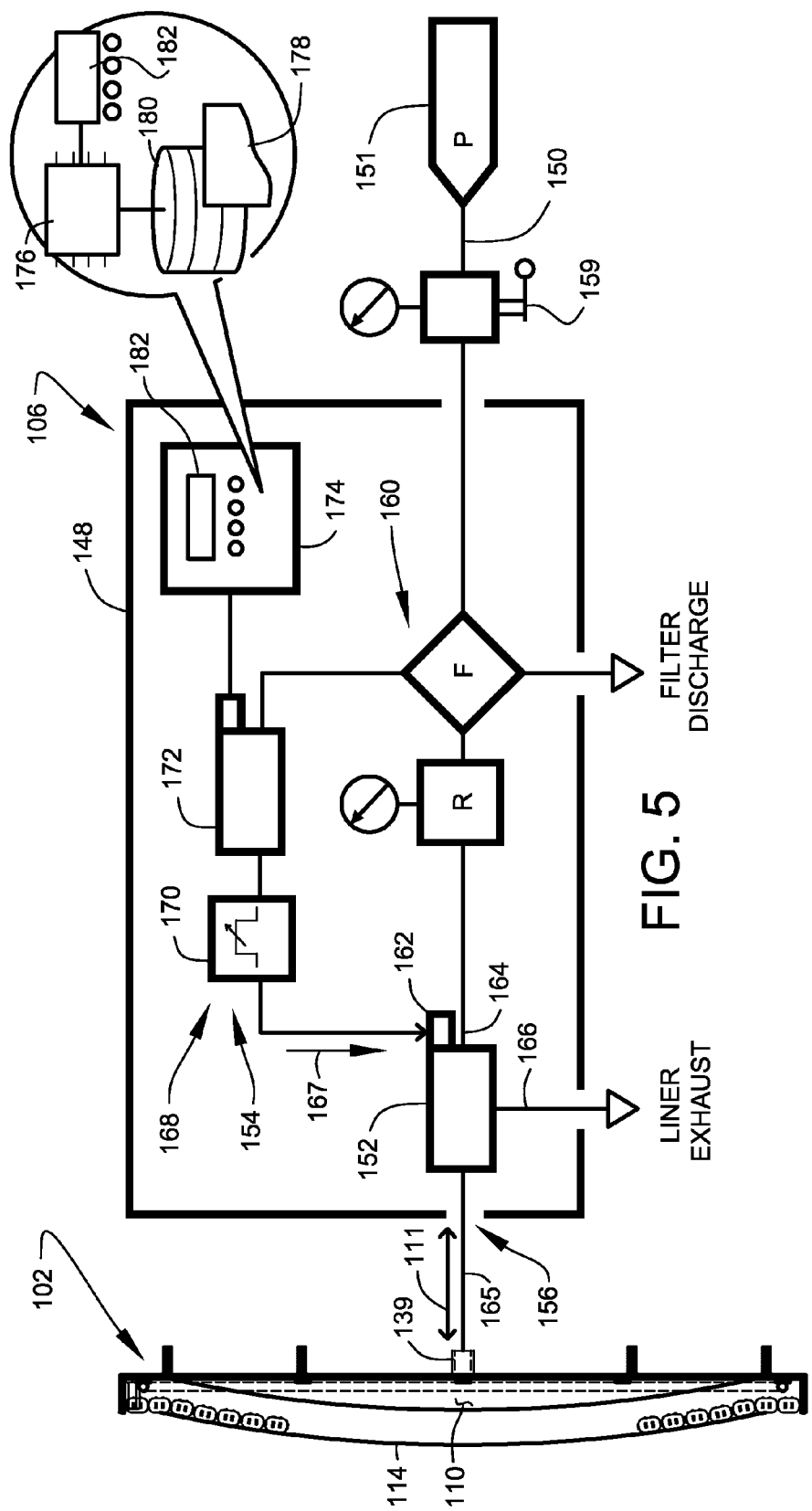
FIG. 5 shows a schematic diagram of the pneumatic inflator apparatus of the inflatable wear liner system of FIG. 1.
Figure 6:
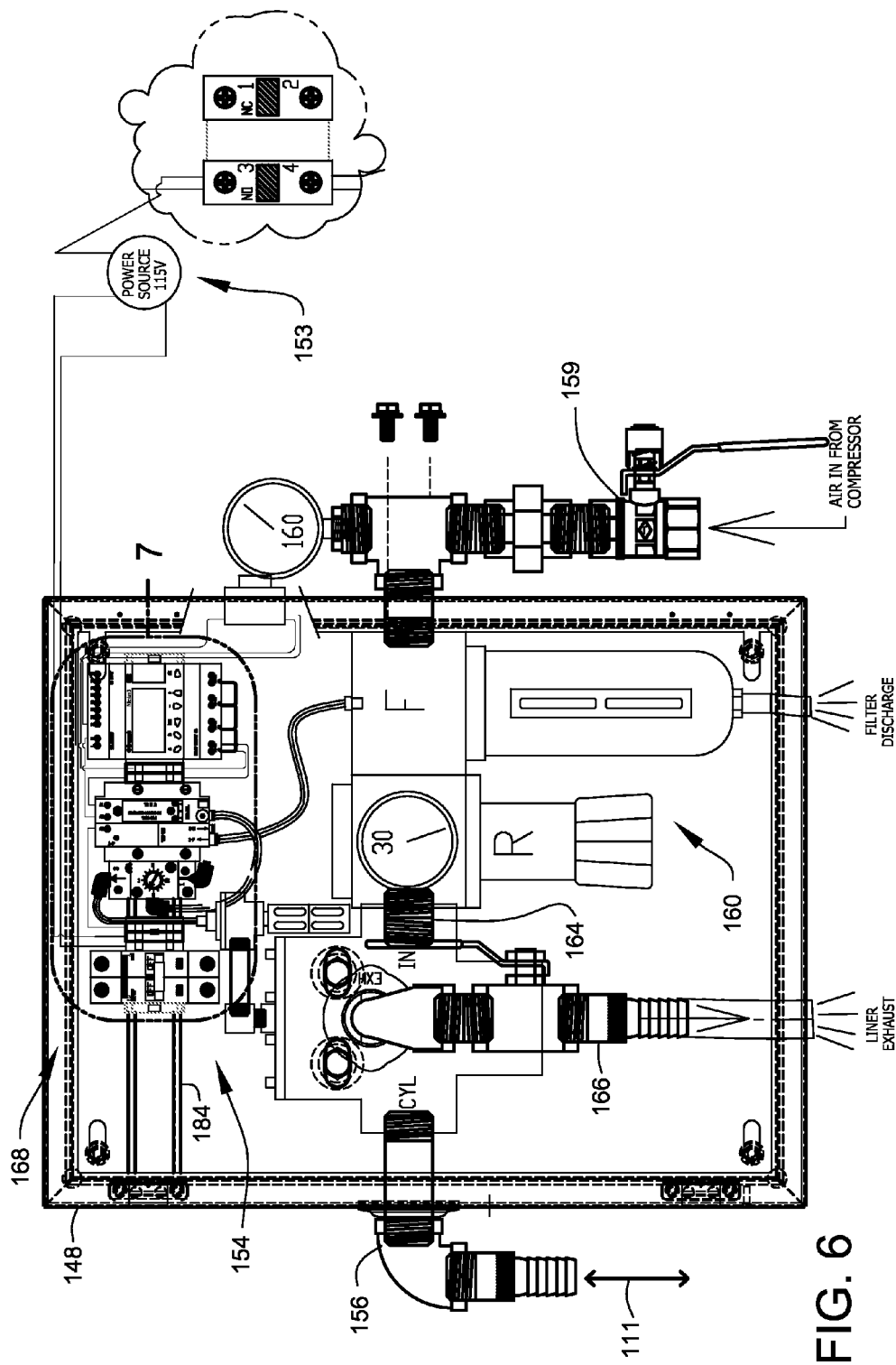
FIG. 6 shows a front view illustrating preferred arrangements of a cabinet-type enclosure configured to enclose the operable components of the pneumatic inflator apparatus, according to a preferred embodiment of the present invention.
Figure 7:
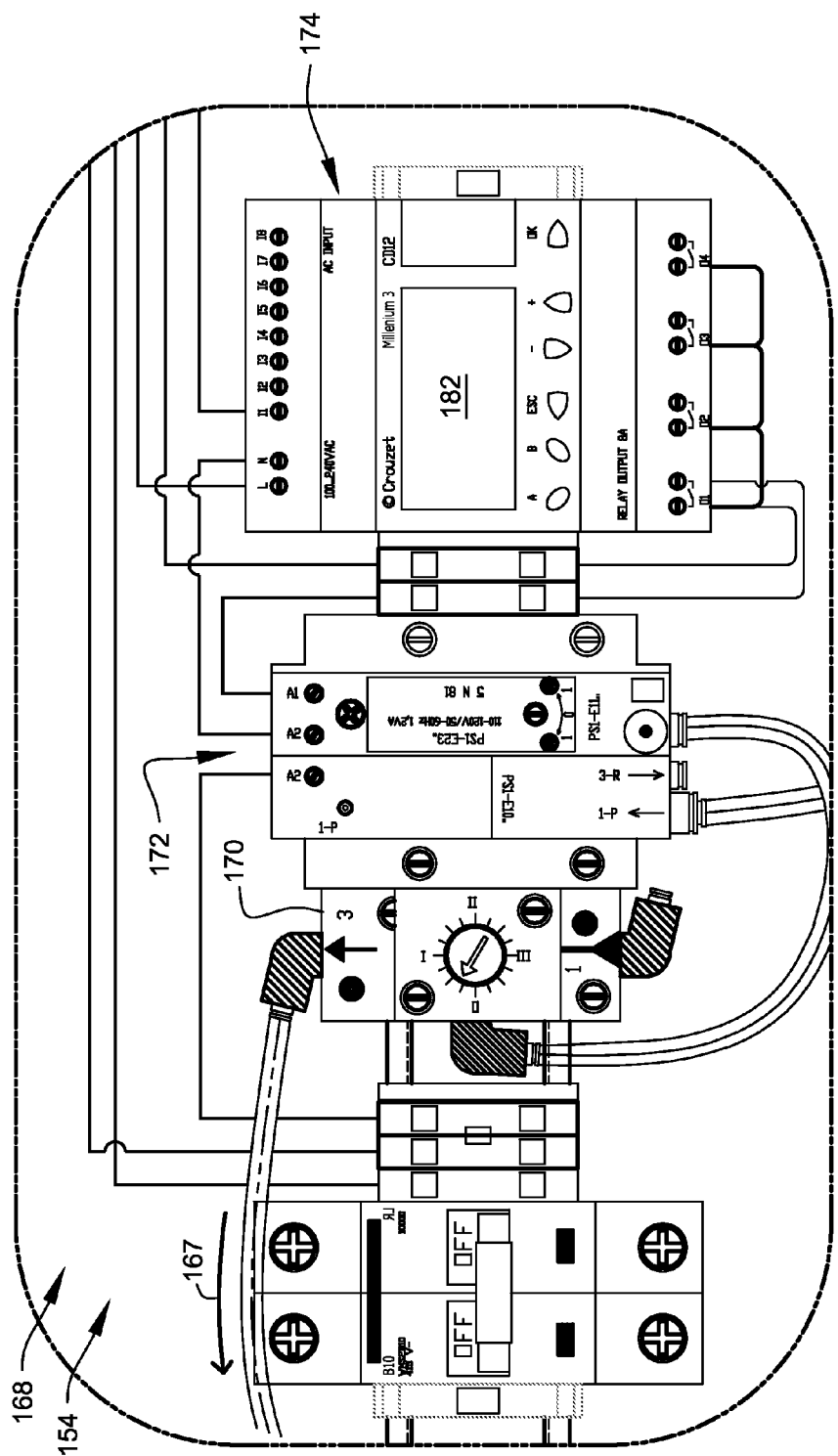
FIG. 7 shows a partial front view, magnified for clarity, of the pneumatic inflator apparatus depicted in FIG. 6.

FIG. 5 shows a diagram schematically illustrating a preferred arrangement of the primary functional components of incremental inflator apparatus 106 of FIG. 1. FIG. 6 shows a front view illustrating preferred arrangements of a cabinet-type enclosure 148 configured to enclose the operable components of incremental inflator apparatus 106, according to a preferred embodiment of the present invention. FIG. 7 shows a partial front view, magnified for clarity, of the incremental inflator apparatus 106 depicted in FIG. 6.

Incremental inflator apparatus 106 (at least embodying herein at least one periodic deformer structured and arranged to periodically deform such at least one deformable liner) preferably comprises input port 150, pneumatically-actuated control valve 152, pneumatic valve controller assembly 154, pulse port 156, electrical power source 153, and the cabinet-type enclosure 148 used to enclose the assembly, as shown.

In a highly preferred embodiment of the system, pressurized air is used as the preferred working fluid. Input port 150 is preferably coupled to at least one pressurized air source 151. One preferred embodiment of the system derives the pressurized air from an air-compressor unit 158 of a type having a mechanically-driven compressor and storage tank (as diagrammatically illustrated in FIG. 1). Upon reading this specification, those with ordinary skill in the art will now appreciate that, under appropriate circumstances, considering such issues as cost, intended use, user preference, etc., other pressurized fluid sources such as, for example, dedicated demand-type compressors located within or adjacent the cabinet, a compressed-gas tank, etc., may suffice.

The input of pressurized air from air-compressor unit 158 is preferably routed through manually operated valve 159 and a conditioning circuit 160 (e.g., filter, regulator, lubricator, pressure gauge, etc.) before entering pneumatically-actuated control valve 152 at inlet port 164, as shown. As illustrated in the schematic diagram, pneumatically-actuated control valve 152 is preferably in communication with both input port 150 and inflatable internal cavity 110 via flow path 165 (preferably connecting pulse port 156 and air passage 139), as shown.

Pneumatically-actuated control valve 152 is preferably configured to control the introduction and discharge of the pressurized air into and from inflatable internal cavity 110. More specifically, pneumatically-actuated control valve 152 preferably comprises an in-line, three-way, normally-closed valve having a remotely-operated pneumatic pilot 162. A preferred three-way valve suitable for use as pneumatically-actuated control valve 152 preferably includes model number N36471091 produced by Parker Hannifin of Cleveland, Ohio. In preferred operation, inlet port 164 of pneumatically-actuated control valve 152 is normally blocked and exhaust port 166 is normally open (and connected with inflatable internal cavity 110 via the connective flow path 165). This initial valve state preferably allows inflatable internal cavity 110 to equalize to the ambient pressure of the working environment. Application of an air signal 167 at pneumatic pilot 162 preferably connects inlet port 164 to inflatable internal cavity 110 and blocks the flow path to exhaust port 166. This second valve state allows pressurized air from air-compressor unit 158 (or other source) to charge inflatable internal cavity 110. Preferably, the air pressure range used to charge inflatable internal cavity 110 is preferably between about 8 pounds per square inch (psi) to about 20 psi.

The air signal used to actuate pneumatically-actuated control valve 152 is preferably generated by pneumatic valve controller assembly 154 (at least embodying herein at least one pneumatic valve controller structured and arranged to pneumatically control the opening and closing of such at least one pneumatically-actuated control valve). Pneumatic valve controller assembly preferably comprises at least one valve pulser 168 structured and arranged to rapidly "pulse" the operation of pneumatically-actuated control valve. More specifically, valve pulser 168 is preferably configured to generate a rapid succession of air signals at a user-selectable pulse frequency.

Valve pulser 168 preferably comprises a pneumatic-pulse generator or electric timer and timer-controlled solenoid valve whose basic function, when combined, is to generate the rapid sequence of pneumatic signals used to actuate pneumatically-actuated control valve 152. More specifically, valve pulser 168 preferably consists of a pneumatic-pulse generator 170, electrically-actuated valve 172, and electronic controller 174, as shown.

Pneumatic-pulse generator 170 is preferably used to directly generate the pulsed pneumatic signal passed to pneumatic pilot 162. Pneumatic-pulse generator 170 is preferably operated by an input of the pressurized air provided by electrically-actuated valve 172. Electrically-actuated valve 172 is preferably configured to enable or disable the passage of the pressurized air to pneumatic-pulse generator 170. Operation of electrically-actuated valve 172 is preferably controlled through logic control provided by programmable electronic controller 174, as shown. The programmable electronic controller 174 is preferably used to generate an electronic control signal 173 passed to electrically-actuated valve 172. Actuation of electrically-actuated valve 172 is preferably based on the state of the electronic control signal supplied by electronic controller 174.

Electronic controller 174 preferably comprises at least one computer processor 176 interoperating with at least one set of program instructions 178 stored within onboard computer memory 180. The output state of the electronic control signals communicated to electrically-actuated valve 172 is preferably governed by the program instructions 178 executed within computer processor 176. Electronic controller 174 preferably comprises at least one user programming interface 182 to enable user programming of the program instructions 178. Preferred program variables include frequency and duration of the actuation of electrically-actuated valve 172.

Pneumatic-pulse generator 170, electrically-actuated valve 172, and electronic controller 174 preferably comprise a set of interoperating modular components derived from general industrial automation product lines. A preferred supplier of the components is Crouzet North America of Irvine Calif. and Parker Haflin Corporation of Cleveland Ohio. A preferred Crouzet product suitable for use as pneumatic-pulse generator 170 preferably includes adjustable frequency generator model 81-506-940. The Crouzet unit preferably comprises a frequency output manually adjustable between about 0.02 Hertz (Hz) and about 8 Hz. It is noted that, within this preferred frequency range, the rate of active positive-pressure charging of inflatable internal cavity 110 is greater than the rate of passive exhausting of air from the cavity (see the pressure-time profile illustrated in the graph of FIG. 8). This preferred pressure profile produces the dynamic outward deformation of the exposed outer wear surfaces 114 in addition to producing vibration energy, which is preferably imparted to the bulk materials during the inflation cycle.

A preferred product suitable for use as electrically-actuated valve 172 preferably comprises a 3-way PS1E series electro-pneumatic interface valve for 110-volt alternating current (AC) produced by Parker Haflin. Such electro-pneumatic interface valve is preferably accompanied by supportive accessories appropriate to the installation, preferably including head and tail sets for (DIN) rail mounting, electrical breakers, etc. It is noted that Appendix A includes a schematic diagram illustrating a preferred electrical supply and controller arrangements supporting the operation of electrically-actuated valve 172 and electronic controller 174.

A preferred Crouzet product suitable for use as electronic controller 174 preferably includes the MILLENIUM 3 range of programmable logic controllers. Program instructions 178 are preferably developed using proprietary Crouzet logic controller software provided with the unit. Other timing functions are preferably set using the built-in user programming interface 182, which preferably enables direct user manipulation of the program instructions. Upon reading this specification, those with ordinary skill in the art will now appreciate that, under appropriate circumstances, considering such issues as cost, user preference, etc., other control arrangements such as, for example, simple electronic timers, remote computer interfaces and/or controls, etc., may suffice.

The hardware of the conditioning circuit 160, pneumatically-actuated control valve 152, and pneumatic valve controller assembly 154 are preferably housed within the cabinet-type enclosure 148, as shown. The components of pneumatic valve controller assembly 154 are preferably mounted to the interior of cabinet-type enclosure 148 using a DIN-type mounting rail 184 (see FIG. 6 and FIG. 7). A DIN rail is a standardized 35 mm-wide metal rail with a "hat-shaped" cross section. Upon reading this specification, those with ordinary skill in the art will now appreciate that, under appropriate circumstances, considering such issues as cost, advances in mounting technology, user preference, etc., other mounting arrangements such as, for example, Unistrut®-type channel mounts, rack-mounting hardware, cabinet-specific mounts, magnetic mounts, etc., may suffice.

In preferred use, one or more inflatable wear liners 104 of inflatable wear liner embodiment 102 are installed on the interior wall surfaces 109 hopper 101 (or other user-preferred device). As material is passed through the hopper, the inflatable wear liners 104 assist reducing the wear and abrasion to the internal surfaces of the hopper. Inflatable wear liner embodiment 102 maintains the flow performance of hopper 101 by periodically dislodging accumulations of cohesive bulk materials, which tends to collect over the surfaces of inflatable wear liners 104 during the material handling operations.

Certain materials, especially cohesive materials, introduced into hopper 101 often develop bridges, rat holes, and similar flow-inhibiting deposits within the material delivery passage 103. In such cases, the system can be programmed to periodically initiate an inflation cycle whereby the inflatable wear liners 104 undergo the above-described vibratory inflation. In such an inflation cycle, any stagnant buildup of cohesive material is effectively dislodged by the combined outward deformation and vibration of the inflatable wear liners 104.

In most installations, a single pneumatic inflator apparatus 106 can be used to inflate four individual inflatable wear liners 104 (each one preferably comprising an internal volume approximately equivalent to the others). In this preferred arrangement, the connective flow path 165 is preferably configured to form a manifold distribution of air pressure between the inflator apparatus and the multiple inflatable liners.

Figure 8:
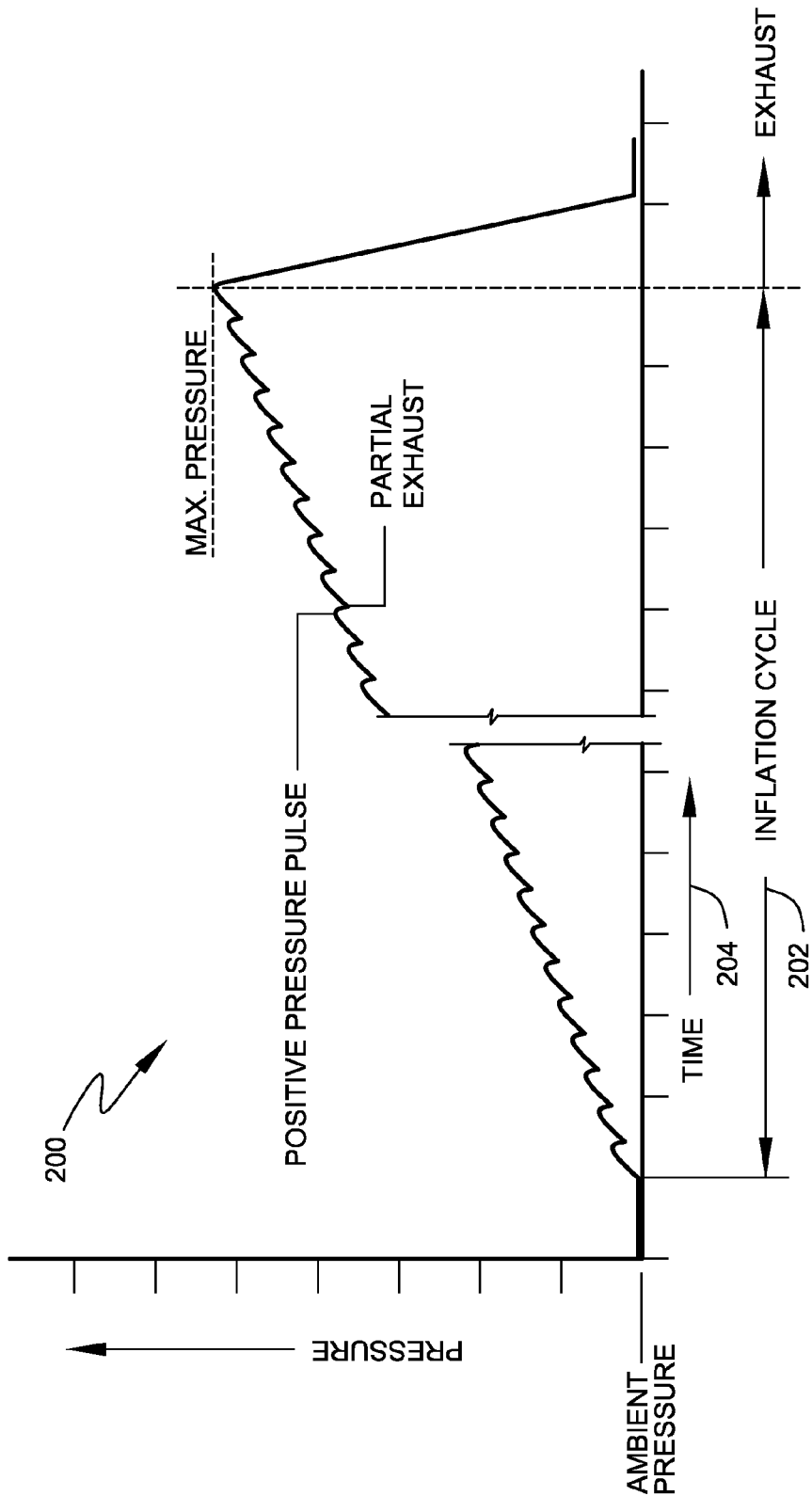
FIG. 8 shows a graphic plot, illustrating a representative pressure-time profile for a single incremental inflation cycle of the inflatable wear liner embodiment, according to the preferred embodiment of FIG. 1.

FIG. 8 shows a graphic plot, illustrating a representative pressure-time profile 200 correlating to a single incremental inflation cycle 202 of inflatable wear liner embodiment 102, according to the preferred embodiment of FIG. 1. The horizontal divisions of the diagram represent a timescale 204 indicating the time interval in which the incremental inflation cycle 202 occurs. The vertical divisions of the diagram indicate the relative pressure levels within inflatable internal cavity 110. As indicated in the plot, inflatable internal cavity 110 is incrementally inflated using a rapid sequence of positive pressure pulses separated by small deflationary pressure drops within the internal cavity. The effect of such pulsed delivery is a vibratory outward deflection of outer wear surface 114 (with each pulse incrementally expanding outer wear surface 114 toward a maximum line of outward deflection 146 shown in FIG. 3 and FIG. 5). Applicant has determined that such outward deflection, when combined with such vibratory transitional movement, to be unexpectedly effective in dislodging stagnant bulk materials within material handling passage.

Figure 9:
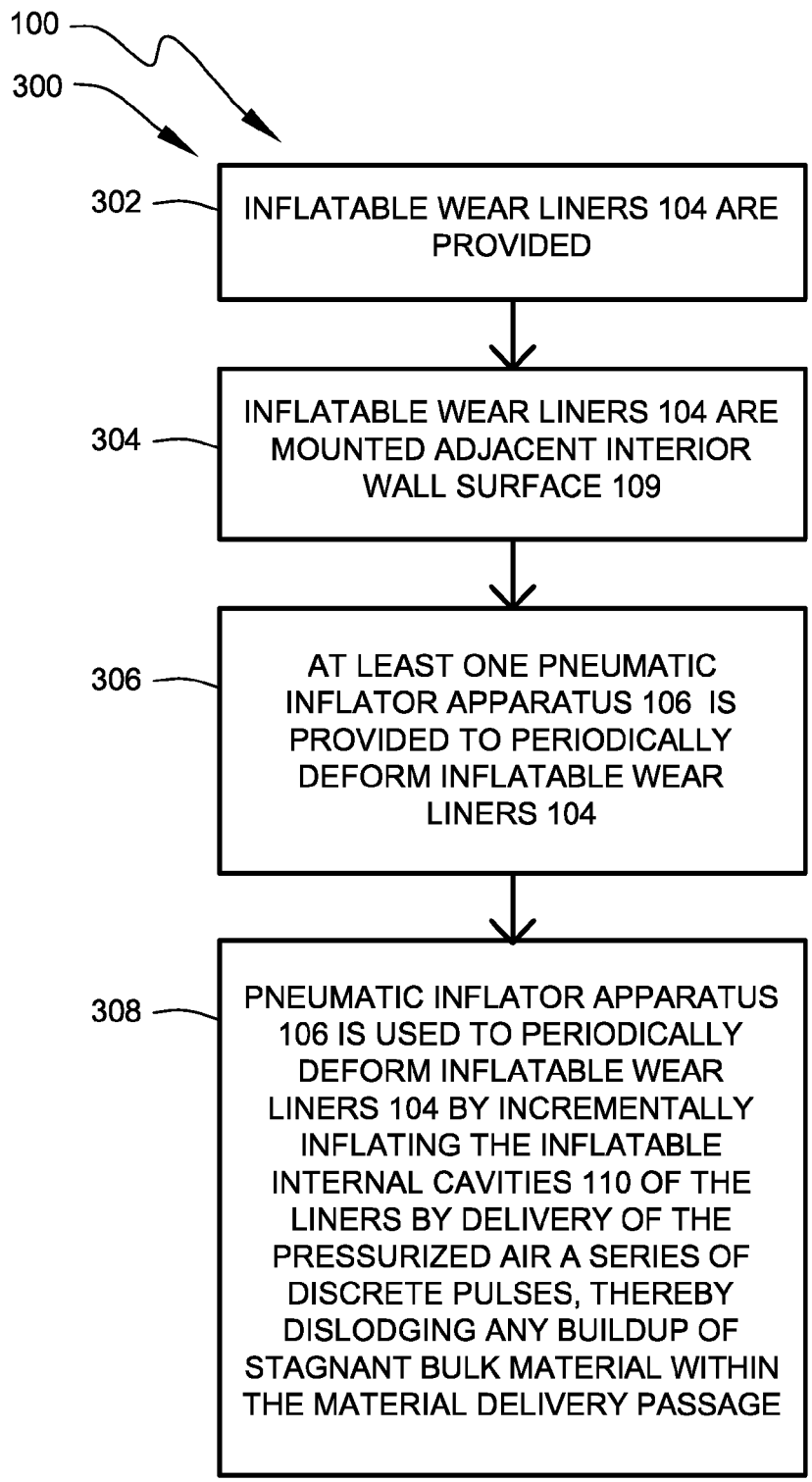
FIG. 9 shows a flow diagram illustrating a preferred method of implementing the preferred inflatable wear liner embodiments of the present invention.

FIG. 9 shows a flow diagram illustrating a preferred method 300 of implementing the preferred inflatable wear liner embodiments 102 of the present invention. Method 300 preferably relates to using inflatable wear liner embodiment 102 to prevent the bulk materials from accumulating within material delivery passage 103 during material handling operations.

In initial preferred step 302, one or more inflatable wear liners 104 are provided to line interior wall surface 109 of material delivery passage 103. Next, as indicated in preferred step 304, inflatable wear liners 104 are mounted adjacent interior wall surface 109. Next, as indicated in preferred step 306, at least one pneumatic inflator apparatus 106 (at least embodying herein at least one pneumatic deformer) is provided to periodically deform inflatable wear liners 104 by incrementally inflating the pneumatic inflator apparatus 106 is used to periodically deform inflatable wear liners 104 by incrementally inflating the inflatable internal cavities 110 of the liners by delivery of the pressurized air a series of discrete pulses, thereby dislodging any buildup of stagnant bulk material within the material delivery passage inflatable internal cavities 110 of the liners. This preferred step also preferably includes operably coupling pneumatic inflator apparatus 106 inflatable wear liners 104, as described in the prior teachings. Next, as indicated in preferred step 308, pneumatic inflator apparatus 106 is used to periodically deform inflatable wear liners 104 by incrementally inflating the inflatable internal cavities 110 of the liners by delivery of the pressurized air a series of discrete pulses, thereby dislodging any buildup of stagnant bulk material within the material delivery passage.

Upon reading this specification, those with ordinary skill in the art will now appreciate that, the illustrated inflatable wear liners 104 is representative of a preferred embodiment, however, other sizes and arrangements may suffice.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A system relating to preventing material from accumulating on at least one interior wall surface of at least one material delivery passage during material handling operations, said system comprising:
    a) at least one wear liner structured and arranged to line the at least one interior wall surface of the at least one material delivery passage, such at least one wear liner comprising
        i) at least one material-exposed wear layer structured and arranged to reduce abrasive wear to the at least one interior wall surface during such material handling operations, and
        ii) at least one inflatable cavity structured and arranged to allow pressurized air to be introduced between said at least one material-exposed wear layer and the at least one interior wall surface;
    b) at least one wear-layer vibrator structured and arranged to vibrate said at least one material-exposed wear layer;
    c) wherein said at least one wear layer-vibrator comprises at least one incremental inflator structured and arranged to incrementally inflate said at least one inflatable cavity using pressurized air supplied to said at least one inflatable cavity in at least one series of pressure pulses, each pressure pulse of the at least one series separated by at least one partial deflation of said at least one inflatable cavity;
    d) wherein said at least one partial deflation comprises a deflation amount less than an inflation amount caused by an immediately preceding pressure pulse;
    e) at least one mount structured and arranged to mount said at least one wear liner over the at least one interior wall surface;
    f) wherein said at least one material-exposed wear layer comprises at least one deformable composition;
    g) wherein such incremental inflation of such at least one inflatable cavity produces incremental outward deformation of said at least one material-exposed wear layer;
    h) wherein such incremental outward deformation vibrates said at least one material-exposed wear layer; and
    i) wherein such incremental outward deformation of said at least one material-exposed wear layer assists in dislodging accumulations of the material within at least one material delivery passage during such material handling operations.

2. The system according to claim 1 wherein said at least one incremental inflator comprises:
    a) at least one pressure access port structured and arranged to access the pressurized air supplied from at least one pressurized air source,
    b) in fluid communication with said at least one pressure access port and said at least one inflatable cavity, at least one pneumatically-actuated control valve structured and arranged to control the introduction and discharge of pressurized air into and from said at least one inflatable cavity, and
    c) at least one pneumatic valve controller structured and arranged to pneumatically control opening and closing of said at least one pneumatically-actuated control valve;
    d) wherein said at least one pneumatic valve controller comprises at least one valve pulser structured and arranged to cyclically actuate opening and closing of said at least one pneumatically-actuated control valve to repeatedly inflate and partially deflate said at least one inflatable cavity by supplying pressurized air in at least one series of pressure pulses.

3. The system according to claim 2 wherein said at least one pneumatic valve controller further comprises at least one controller structured and arranged to electronically control the duration of the operation of said at least one valve pulser.

4. The system according to claim 3 wherein said at least one controller comprises:
    a) at least one computer processor to computer process at least one set of program instructions governing control outputs of said at least one controller; and
    b) at least one user programming interface.

5. The system according to claim 2 wherein:
    a) said at least one valve pulser comprises at least one frequency adjuster structured and arranged to adjust the frequency of such series of pressure pulses; and
    b) said at least one frequency adjuster is adjustable by a user.

6. The system according to claim 2 wherein said at least one material-exposed wear layer comprises:

a) at least one abrasion-resistant core comprising a plurality of abutting wear elements each wear element of said plurality comprising a block of abrasion-resistant material; and
b) at least one resilient encapsulator structured and arranged to substantially encapsulate said at least one abrasion-resistant core.

7. The system according to claim 6 wherein said at least one inflatable cavity comprises:
a) at least one pressure boundary structured and arranged to provide boundary containment of the pressurized air adjacent said at least one material-exposed wear layer;
b) wherein said at least one pressure boundary comprises at least one peripheral anchor to anchor at least one peripheral portion of said at least one material-exposed wear layer to said at least one pressure boundary; and
c) in fluid communication with said at least one pneumatically-actuated control valve, at least one pressure-boundary air passage structured and arranged to pass the pressurized air through said at least one pressure boundary to said at least one inflatable cavity.

8. The system according to claim 6 wherein said abrasion-resistant material of each said wear element comprises at least one ceramic.

9. The system according to claim 6 wherein said at least one resilient encapsulator comprises rubber.

10. The system according to claim 7 wherein:
a) said at least one pressure boundary comprises at least one rigid plate having at least one inner boundary face and at least one continuous peripheral sidewall projecting therefrom;
b) said at least one peripheral anchor comprises at least one linear bar mechanically joined with said at least one inner boundary face and firmly imbedded within said at least one resilient encapsulator.

11. The system according to claim 7 wherein:
a) said at least one rigid plate comprises steel; and
b) said at least one mount comprises at least one threaded stud structured and arranged to receive at least one threaded fastener to assist threaded fastening of said at least one wear liner to the at least one interior wall surface.

12. A system relating to preventing material from accumulating on at least one interior wall surface of at least one material delivery passage during material handling operations, said system comprising:
a) at least one wear liner structured and arranged to line the at least one interior wall surface of the at least one material delivery passage;
b)
c) wherein said at least one deformable liner comprises
i) at least one mount structured and arranged to firmly mount said at least one deformable liner adjacent the at least one interior wall surface,
ii) at least one wear layer comprising at least one material-exposed surface, said at least one wear layer structured and arranged to reduce abrasive wear to the at least one interior wall surface during such material handling operations, and
iii) at least one inflatable cavity structured and arranged to allow at least one positive-pressure fluid to be introduced between said at least one wear layer and the at least one interior wall surface;
d) at least one surface vibrator structured and arranged to vibrate said at least one material-exposed surface;
e) wherein said at least one surface vibrator comprises at least one periodic deformer structured and arranged to periodically deform said at least one wear layer;
f) wherein said at least one periodic deformer comprises
i) at least one fluid access port structured and arranged to access the at least one positive-pressure fluid supplied from at least one positive-pressure fluid source,
ii) in fluid communication with said at least one fluid access port and said at least one inflatable cavity, at least one control valve structured and arranged to control the introduction and discharge of the at least one positive-pressure fluid into and from said at least one inflatable cavity, and
iii) at least one valve controller structured and arranged to control the opening and closing of said at least one control valve,
iv) wherein said at least one valve controller comprises at least one valve pulser structured and arranged to cyclically actuate opening and closing of said at least one control valve;
g) wherein such cyclic actuation of said at least one control valve incrementally inflates said at least one inflatable cavity by supplying the at least one positive-pressure fluid in at least one series of pressure pulses;
h) wherein each pressure pulse of the at least one series is separated by at least one partial deflation of said at least one inflatable cavity;
i) wherein said at least one partial deflation comprises a deflation amount less than an inflation amount caused by the preceding pressure pulse;
j) wherein said at least one wear layer comprises at least one deformable composition;
k) wherein incremental inflation and partial deflation of said at least one inflatable cavity produces incremental outward deformation of said at least one material-exposed surface;
l) wherein such incremental outward deformation vibrates said at least one material-exposed surface; and
m) wherein incremental outward deformation of said at least one material-exposed surface assists in dislodging accumulations of material within at least one material delivery passage during material handling operations.

13. The system according to claim 12 wherein:
a) the at least one positive-pressure fluid comprises pressurized air; and
b) said at least one periodic deformer is structured and arranged to utilize the pressurized air as the at least one positive-pressure fluid.

14. The system according to claim 13 wherein:
a) said at least one control valve comprises at least one pneumatically-actuated valve structured and arranged to be actuated by at least one pulsed pneumatic signal;
b) said at least one valve pulser comprises
i) at least one pneumatic-pulse generator structured and arranged to output such at least one pulsed pneumatic signal using at least one input of the pressurized air;
ii) in fluid communication with at least one source of pressurized air, at least one electrically-actuated valve structured and arranged to supply at least one input of pressurized air to said at least one pneumatic-pulse generator, the supplying of which is conditional on at least one change of state of at least one electronic control signal received by said at least one electrically-actuated valve, and iii) at least one electronic controller structured and arranged to generate at least one electronic control signal controlling actuation of said at least one electrically-actuated valve.

15. The system according to claim 14 wherein said at least one electronic controller comprises at least one programmable logic controller comprising at least one computer processor to computer process at least one set of program instructions governing the output state of such at least one electronic control signal.

16. The system according to claim 15 wherein said at least one electronic controller further comprises at least one user programming interface to enable user programming of said at least one set of program instructions.

17. The system according to claim 12 wherein said at least one wear layer comprises:
   a) at least one abrasion-resistant core comprising a plurality of abutting wear elements each wear element of said plurality comprising a monolithic solid of abrasion-resistant material;
   b) at least one resilient encapsulator structured and arranged to substantially encapsulate said at least one abrasion-resistant core;
   c) wherein said at least one resilient encapsulator comprises said at least one material-exposed surface, at least one inner encapsulator surface spaced opposite said at least one material-exposed panel surface, and at least one peripheral portion extending peripherally between said at least one material-exposed panel surface and said at least one inner encapsulator surface.

18. The system according to claim 17 wherein said at least one inflatable cavity comprises:
   a) at least one pressure boundary structured and arranged to provide boundary containment of the pressurized air adjacent said at least one inner surface;
   b) wherein said at least one pressure boundary comprises at least one peripheral anchor to anchor said at least one peripheral portion to said at least one pressure boundary; and
   c) in fluid communication with said at least one control valve, at least one pressure-boundary air passage structured and arranged to pass pressurized air through said at least one pressure boundary to said at least one inflatable cavity.

19. The system according to claim 18 wherein said abrasion-resistant material of each said wear element comprises at least one ceramic.

20. The system according to claim 18 wherein said at least one resilient encapsulator comprises rubber.

21. The system according to claim 20 wherein:
   a) said at least one pressure boundary comprises at least one rigid plate having at least one inner boundary face and at least one continuous peripheral sidewall projecting therefrom;
   b) said at least one peripheral anchor comprises at least one linear bar mechanically joined with said at least one inner boundary surface and firmly imbedded within said at least one resilient encapsulator.

22. The system according to claim 21 wherein:
   a) said at least one rigid plate comprises substantially steel; and
   b) said at least one mount comprises at least one projection, permitting secure connection on a user-reachable side of the material handling device, to assist fastening of said at least one deformable liner to the at least one interior wall surface.

23. A method relating to preventing material from accumulating on at least one interior wall surface of at least one material delivery passage during material handling operations, said method comprising the steps of:
   a) providing at least one deformable liner structured and arranged to deformably line the at least one interior wall surface of the at least one material delivery passage, such at least one deformable liner comprising
      i) at least one deformable wear panel, comprising at least one material-exposed panel surface, such at least one deformable wear panel structured and arranged to reduce abrasive wear to the at least one interior wall surface during such material handling operations, and
      ii) at least one inflatable cavity structured and arranged to allow pressurized air to be introduced between such at least one deformable wear panel and the at least one interior wall surface;
   b) providing at least one surface vibrator structured and arranged to vibrate such at least one material-exposed panel surface;
   c) wherein surface vibrator comprises at least one incremental deformer structured and arranged to incrementally deform such at least one deformable liner by repeatedly inflating and partially deflating such at least one inflatable cavity;
   d) mounting such at least one deformable liner adjacent the at least one interior wall surface; and
   e) periodically deforming such at least one deformable liner by repeatedly inflating and partially deflating such at least one inflatable cavity by delivery of the pressurized air in a series of pressure pulses;
   f) wherein the partially deflating comprises a deflation amount less than an inflation amount caused by an immediately preceding inflating;
   g) wherein such incremental inflation of such at least one inflatable cavity produces incremental outward deformation of such at least one material-exposed panel surface; and
   h) wherein such incremental outward deformation vibrates such at least one material-exposed surface.

24. A system relating to preventing material from accumulating on at least one interior wall surface of at least one material delivery passage during material handling operations, said system comprising:
   a) deformable liner means for deformably lining the at least one interior wall surface of the at least one material delivery passage; and
   b) periodic deformer means for periodically deforming said deformable liner means to assist dislodging accumulations of the material within at least one material delivery passage during such material handling operations;
   c) wherein said deformable liner means comprises
      i) mount means for firmly mounting said deformable liner means adjacent the at least one interior wall surface
      ii) deformable wear surface means for reducing abrasive wear to the at least one interior wall surface during such material handling operations, and
      iii) inflatable cavity means for allowing at least one positive-pressure fluid to be introduced between said deformable wear surface means and the at least one interior wall surface;
   d) wherein said periodic deformer means comprises
      i) fluid access means for accessing the at least one positive-pressure fluid supplied from at least one positive-pressure fluid source, ii) in fluid communication with said fluid access means and said inflatable cavity means control valve means for controlling the introduction and discharge of the at least one positive-pressure fluid into and from said inflatable cavity means, and
iii) valve controller means for controlling the opening and closing of said control valve means;
iv) wherein said valve controller means comprises valve pulser means for cyclically actuating the opening and closing of said control valve means;
e) wherein such cyclic actuation of said control valve means incrementally inflates said inflatable cavity means by supplying the at least one positive-pressure fluid in a series of pressure pulses;
f) wherein such incremental inflation of said inflatable cavity means produces incremental outward deformation of said deformable wear surface means; and
g) wherein such incremental outward deformation of said deformable wear surface means assists in dislodging accumulations of the material within at least one material delivery passage during such material handling operations.

\* \* \* \* \*